United States Patent Office 3,113,189
Patented Dec. 3, 1963

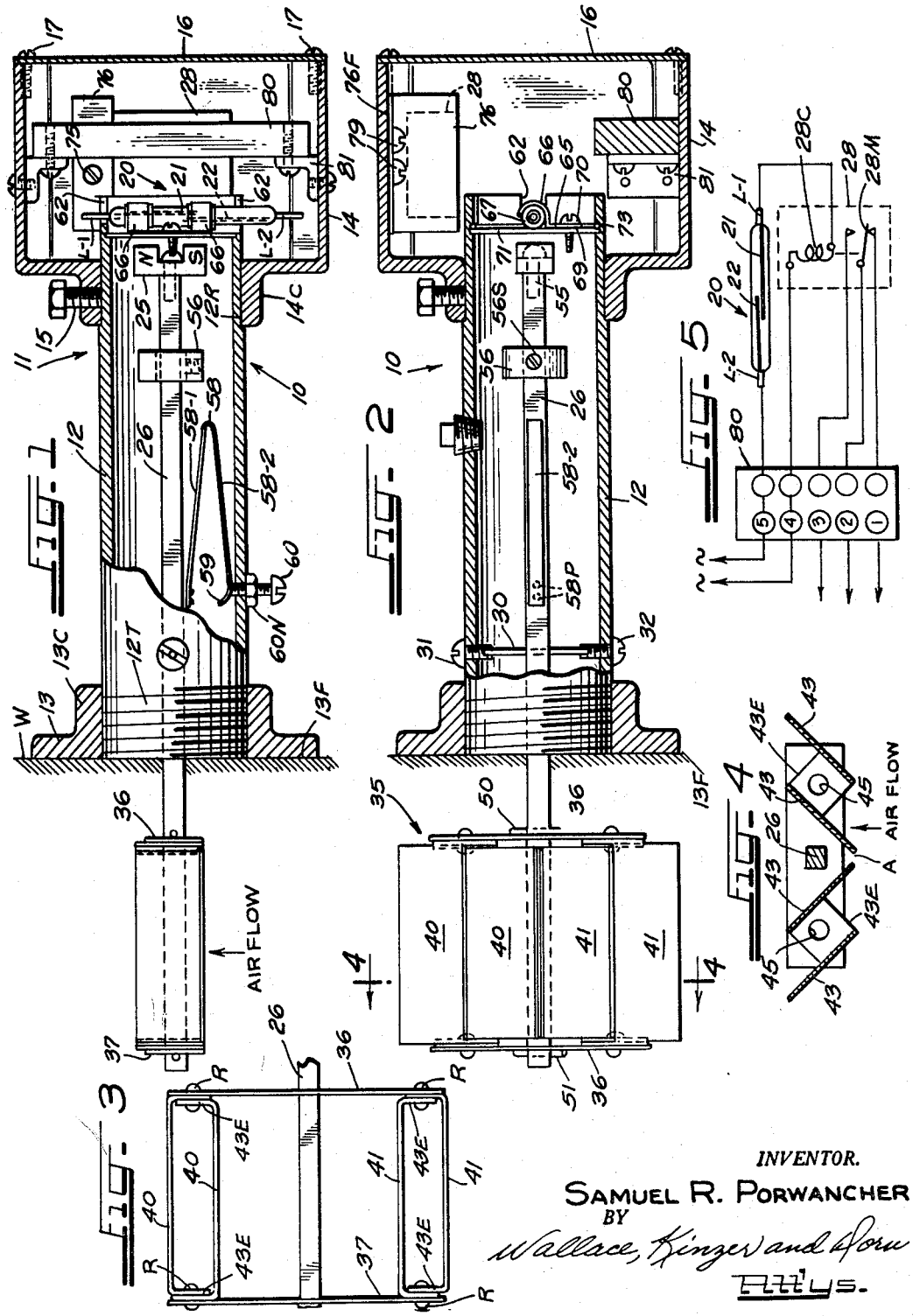

3,113,189
FLUID FLOW RESPONSIVE SWITCH APPARATUS
Samuel R. Porwancher, Chicago, Ill., assignor, by mesne assignments, to Michigan Oven Company, Detroit, Mich., a corporation of Michigan
Filed Sept. 21, 1960, Ser. No. 57,549
5 Claims. (Cl. 200—81.9)

This invention relates to switch apparatus that is responsive to velocity gradients in a moving stream of fluid such as air or the like in a duct.

The switch apparatus of the present invention is one that will provide protection in the event of failure of air flow in a duct system characterized by lack of sufficient velocity of the moving stream of gas in the duct. A protective device of this kind is essential in a wide variety of heating and ventilating systems where safety controls are to be actuated, or where a relay or signalling device is to be energized in the event of failure of gas flow. Of course, failure of gas flow as one manifestation of failure to conform to a predetermined standard is merely one example of a velocity gradient, and it will be apparent from the specific nature of the switch apparatus hereinafter described that the same is responsive to a predetermined change in the velocity of a moving stream of gas or other fluid. Additionally, the associated control circuit can be responsive in either an opening or closing sense.

Thus, the primary object of the present invention is to construct a switch that will be highly sensitive to velocity gradients in a moving stream of fluid and to assure that the movable parts of the switch will offer minimum resistance to the flow of air or other fluid medium. In this connection, another object of the present invention is to so construct the switch mechanism that it is dead-ended to the flow of fluid such as air in a duct or the like, and as a consequence of this the fluid cannot flow through the device and hence the likelihood of contamination of electrical parts is eliminated. Mechanical linkages are reduced to a minimum, and actuation of the electrical contacts embodied in the switch is under control of a magnet. Such construction in part assures the sensitivity that is sought in the present instance, and such constitutes another object of the present invention.

Another object of the present invention is to have the parts so balanced and oriented that the apparatus can be mounted in virtually any position on the duct through which the measured fluid moves.

Specifically, the switch apparatus of the present invention includes a housing having a separate chamber in which the electrical contact elements of a primary control switch are effectively sealed against contamination. The switch contacts are held biased in one condition of state by a magnet at one end of a balanced pivot arm. When the proximate location of the effective field of the magnet is changed, the switch contact condition changes. The arm which carries the magnet is located within another chamber of the housing, and the end of the arm opposite the magnet is provided with vane elements that are to be interposed in the system of moving fluid to be subjected to the velocity thereof. A counterweight is adjustably associated with the pivoted arm, and pivoting action of the arm is resisted by an adjustable spring. By making the necessary adjustments in the counterweight and in the spring, the initial balanced condition for the neutral or normal position of the magnet can be related to a particular velocity for the fluid in the duct with which the apparatus of the present invention is associated. Any departure from the predetermined velocity condition results in movement of the pivoted arm which, of course, is manifest in the consequent movement of the aforesaid magnet and relocation of its magnetic field whereby the switch contacts reverse, thereby opening or closing the control, safety or signalling circuit.

The specific construction capable of balancing as aforesaid enables the apparatus to be mounted in any position, that is, at any angle and on any side of the duct, and the apparatus can be used either on the suction or pressure side of a fan or blower associated with the duct. The primary switch having the magnetically responsive contacts can of course have either a closed or open state in the normal position of the magnet, and when the arm is unbalanced the magnetic field shifts to displace its bias with respect to the switch contacts which thereupon reverse. These advantages represent other objects of the present invention.

Other and further objects of the present invention will be apparent from the following description and claims and are illustrated in the accompanying drawing which, by way of illustration, shows a preferred embodiment of the present invention and the principle thereof and what is now considered to be the best mode for applying that principle. Other embodiments of the invention embodying the same or equivalent principle may be made as desired by those skilled in the art without departing from the present invention, and the purview of the appended claims.

In the drawings:

FIGS. 1 and 2 are different sectional views taken through switch apparatus constructed in accordance with the present invention;

FIG. 3 is a plan view of the vane on the control arm of the switch apparatus and showing the relationship of the vanes thereto;

FIG. 4 is a sectional view taken on the line 4—4 of FIG. 2; and

FIG. 5 is a wiring diagram.

The switch apparatus 10 of the present invention, FIGS. 1 and 2, includes what can be viewed as essentially a three part housing 11 which includes an intermediate tubular element 12 of brass, a mounting element in the form of a flange 13 at one end of the tube 12, and a relatively large box-like housing member 14 of cast aluminum at the opposite end of the tube 12. Thus, one end of the elongated tube 12 is threaded at 12T, and a collar portion 13C of the flange 13 is threadedly mounted thereon. The mounting face 13F of the flange 13 is configured to be complemental to the adjacent surface of a wall W of a duct or the like in which there is to be fluid flow such as a stream of air as indicated by the legend in FIG. 1. Suitable mounting screws or the like are of course provided incidental to securing the mounting element 13 to the wall W of the associated duct.

The enlarged housing member 14 is formed with a collar 14C having an internal diameter corresponding to the outside diameter of a rabbeted portion 12R at the end of the tube 12 opposite the threaded portion 12T. Thus, the collar 14C of the housing is fitted onto the rabbeted surface 12R in a sealing relationship and is secured in position by set screws as 15. The tube 12, the flange element 13 and the housing member 14 are one piece parts as will be noted, and the open end of the housing 14 opposite its collar 14C is sealed by a removable cover plate 16 secured in place by a plurality of screws 17 which are screwed into corresponding tapped sockets at the four corners at the open end of the housing member 14. This affords a separate chamber for elements of the control circuit as will be further disclosed.

Thus, it will be seen that the switch apparatus of the present invention when secured to the outside of a duct having a wall W projects therefrom generally at right angles to the path of the moving stream of air or the like in the duct. As will be explained in more detail hereinafter, a reed type switch 20 having magnetizable reed or blade contacts 21 and 22 is secured within the housing member 14 to lie adjacent a magnet 25 carried on a pivoted arm 26, and the primary switch 20 is connected to a relay 28 so as to control operation of the relay as part of the ultimate control circuit with which the present switch apparatus is associated. The parts as shown in FIG. 1 represent the non-operating condition, that is, the relationship of parts at the time of installation when there is no air flow, but after installation and when air is flowing at the correct velocity the magnet 25 is shifted with arm 26, resulting in a relocation of the effective magnetic field.

The control arm 26 is of hard aluminum and normally is to be axially centered within the tube 12. Arm 26 intermediate the ends thereof is drilled and a stainless steel pin 30, FIG. 2, is press fitted therein so that the ends of the pin 30 project symmetrically on opposite sides of the arm 26. A pair of brass bearing screws 31 and 32 are threaded into corresponding openings at opposite sides of the tube 12, and these screws have drilled ends affording openings which serve as bearing supports for the opposite ends of the pin 30 as will be evident in FIG. 2. Thus, in this manner, the arm 26 is delicately pivoted within the housing 12 in a highly sensitive relationship.

The end of the arm 26 opposite that which carries the magnet 25 projects well beyond the corresponding open end of the tube 12, and a vane assembly 35 is secured thereto in position to be interposed in the stream of moving air or like fluid to sense the velocity thereof.

The vane assembly includes a pair of aluminum end plates 36 and 37 of narrow rectangular shape, and these serve as a cradle or support for four aluminum vane elements that are arranged as vane pairs 40 and 41, FIG. 3, on opposite sides of the arm 26. Thus, each vane element includes a rectangular leg as 43, FIG. 4, and each leg element has integrally associated therewith at the opposite ends thereof an ear 43E which is disposed in a plane at right angles to the associated leg 43. Each ear 43E is formed with an opening 45. The vane elements are of identical size and configuration and are opposedly nested as shown in FIG. 3 in pairs at the opposite ends of the end plates 36 and 37 with the ears 43E overlapped so that the openings 45 therein are registered. Thereafter, aluminum rivets R are centered in the registered openings 45 and are deformed in the usual fashion to afford the vane pairs at opposite ends of the end plates 36 and 37 in the relationship shown in FIG. 4. Thus, the fixed relationship of the vane means is such that, the innermost two vanes which lie immediately adjacent the arm 26 are inclined at substantially a 45° angle with respect to the vertical center plane of the arm 26 as viewed in FIG. 4, forming a 90° included dihedral angle. The two outer vanes parallel the inner vanes, but are separated therefrom, forming in effect a passage between the inner and outer vanes. The moving fluid (air) impinging on the vanes is deflected, but passes through the passages, and over the outer vanes. The forces resulting from changing the direction of the fluid flow provide the energy necessary to move the vanes.

The vane assembly is maintained on the end of arm 26 by cotter pins 50 and 51, FIG. 2, and the apex A, FIG. 4, of the angle formed by the inner vanes faces against the direction of air flow—to windward.

The magnet 25 is of the Alnico type and is of U-shape with the bight portion thereof secured to the inner end of arm 26 by a screw 55. Incidental to the attainment of a delicate balance, a counterweight in the form of a steel sleeve 56 is adjustably secured to the arm 26 somewhat outward of the magnet 25, and the adjusted position is maintained by a set screw 56S. Thus, the counterweight 56 is on the side of the pivot 30 opposite the vane assembly 35.

A V-shaped leaf spring 58 of spring steel has one leg 58-1 secured by pins 58P at the free end thereof to the arm 26 inward of the pivot. The other leg 58-2 of the spring 58 has the free end thereof bent at 59 in the direction of the arm 26 so as to afford an arcuate surface on the spring adapted to bear against the end of an adjusting screw 60 which is mounted in the tube 12. Thus, by turning the screw 60 in or out relative to the spring 58, tension on the latter can be predetermined, and such condition is held and maintained by a lock nut 60N threaded on the screw 60 and which bears against the outer surface of the tube 12.

Referring to FIG. 1, it will be noted that the spring 58 is to be located on the windward side of arm 26 when considered from the standpoint of air flow, and inasmuch as the spring 58 is effective on arm 26 on the side of the pivot 30 opposite the vane assembly 35, it will be seen that spring 58 is capable, when tensioned, of exerting a counterclockwise bias on arm 26 as viewed in FIG. 1, that is, a force which tends to turn arm 26 counterclockwise as viewed in FIG. 1 against the clockwise turning moment exerted on arm 26 by the velocity of the moving stream of air or like fluid. Thus, when normal air velocity is established after installation, the force of the air pivots arm 26 clockwise as viewed in FIG. 1. The magnet will shift to close contacts 21 and 22 as will be explained. If the flow of air should thereafter cease, or should drop below the predetermined minimum velocity, spring 58 will be then effective to turn arm 26 counterclockwise about its pivot, and this changes the proximate location of the field of the magnet effective on the switch contacts 20 and 21 as will be further explained.

The reed switch 20 is disposed in a slot 62 at the end of the tube 12 opposite the threaded portion 12T thereof. The leads L1 and L2 respectively associated with the switch contacts 21 and 22 are free of the slot 62 and extend outward therefrom, and it will be noted that the reed switch 20 extends at right angles to the axis of the pivot pin 30. The reed switch 20 is held in place by a clip 65, FIG. 2, having a pair of arcuate fingers 66, FIG. 1 which embrace rubber ferrules 67 that are pressed onto the glass tube of the red switch. The clip 65 is formed with a flange 69 which is secured by a screw 70 to a solid brass seal disc 71 which fits into a corresponding annular groove in the end of the tube 12 adjacent the magnet. The seal disc 71 is maintained in place by a snap ring 73 of stainless steel, and it will be seen from this that the seal disc 71 is effective to close off the inside of the housing member 14 from the chamber afforded by the tube 12 wherein the magnet is located, and at the same time the end cover plate 16 secures the interior of housing 14 against contamination from the ambient atmosphere.

Referring to FIGS. 1 and 2, it will be noted that the relay 28 is fastened by screws as 75 to a bracket 76, and the bracket 76 has a flange 76F in turn fastened to one side of the housing member 14 by a pair of screws as 79. A terminal block 80 is located at the side of the housing member 14 opposite the relay member 28, and is maintained in place by a bracket 81 secured to the housing member 14.

At the time of installation, adjustments will be made in the position of the counterweight 56 and the spring 58 so that the normal velocity of air in the duct will be effective to maintain the arm 26 in a position canted from that illustarted in FIG. 1. In such canted position the poles of the magnet are centered on the blades 21 and 22 which therefore become opposite poles and thereupon close, and spring 58 tends to urge arm 26 counter to the flow of air. When contacts 21 and 22 close, circuit is completed to the coil 28C of relay 28, FIG. 5, and the movable contact 28M in the circuit controlled by relay 28 is shifted, noting that relay 28 is of the single pole, double throw type. This represents the "on" or safe operating state of the apparatus 10.

On the other hand, if the velocity of the air flow should drop below the predetermined minimum as representative of the safe operating condition, spring 58 will in effect take over causing arm 26 to be pivoted back to the position shown in FIG. 1. Such movement is, of course, accompanied by corresponding movement of the magnet 25. The normal closing bias exerted by the magnetic field on the switch 20 is therefore removed, and under this circumstance one of the poles of the magnet 25 is aligned with the overlap of the switch blades 21 and 22 as will be apparent in FIG. 1. As a consequence, the overlap of the blades 21 and 22 is subjected to the bias of only one pole of the magnet and will therefore be held apart. The relay 23C is therefore de-energized, and the movable contact 28M thereof returns to the position shown in FIG. 5.

It will be recognized from the foregoing that the primary switch 20 having the magnetically responsive contacts has off and on conditions determined by the proximate location of the magnetic field. Thus, when air velocity is at a normal or safe rate in the duct, the vane means 35 sense this condition and serve to pivot arm 26 against the action of spring 58 to a point where the magnet 25 is effective to hold switch 20 in one of its two states. This condition will be accurately regulated through adjustments in the counterweight 56 and spring 58, and is manifest in canting of arm 26 out of the position shown in FIG. 1 to locate magnet 25 with its poles symmetrical on the switch contact overlap, and spring 58 is compressed. If the velocity falls below the standard, spring 58 expands because of the lessened air resistance on the vane means 35, and magnet 25 shifts to so relocate its effective field that the switch 20 is permitted to assume the other or open state as it is disclosed in FIG. 1. This state is, of course, that regulated by so conditioning the counterweight and the bias spring 58 as to assure the other state of the switch 20 when the air velocity is at an unsafe level.

The primary switch, relay, and terminal block are safeguarded against contamination by in effect sealing these off within the separate housing chamber afforded by the sealed housing member 14. While this is highly advantageous, the relay as well as its associated circuitry can be located externally of the housing, and moreover it is possible under some circumstances to use the reed switch as the sole control element without a relay. Since the vane means 35 is not responsive to static pressure or static suction in the duct or chamber where it is located, a momentary increase in pressure such as might occur from the puff of a burner will not affect the switch position and will not cause an unnecessary shut-down.

Thu, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. Switch apparatus responsive to the velocity of a stream of fluid and comprising an elongated tubular member and an attaching element at one end thereof adapted to be secured to the wall of a duct in which such a stream moves, an elongated arm extending axially of said member, said arm being pivoted within said tubular member and having an end projected beyond said attaching element so as to be disposable in the duct, vane means on the projected end of said arm in position to be interposed in the stream of fluid to be subjected to the velocity thereof, a magnet on the end of said arm opposite said vane means and disposed within said tubular member, a counterweight on said arm, an enlarged housing member secured in a sealed relationship to the end of the tubular member adjacent said magnet, a reed switch having blades adjacent said magnet and disposed within said enlarged housing, a seal within said tubular member and interposed between said magnet and said reed switch, an end closure plate for said enlarged housing, a relay and a terminal block within said enlarged housing, said relay being connected to said reed switch, and spring means within said tubular member acting on said arm between the pivot and the counterweight and effective to urge said arm counter to the stream of fluid.

2. Switch apparatus responsive to the velocity of a stream of fluid and comprising a housing adapted to be secured to the wall of a duct in which such a stream moves, an arm pivoted within said housing and having an end projected beyond said housing so as to be disposable in the duct, vane means on the projected end of said arm in position to be interposed in the stream of fluid to be subjected to the velocity thereof, a counterweight adjustably mounted on said arm intermediate the ends thereof within said housing, a magnet on the end of said arm opposite said vane means, a reed switch having magnetizable blades adjacent said magnet, a relay connected to the reed switch, a terminal block for the reed switch and the relay, said reed switch, said relay and said terminal block being sealed from said magnet and from the ambient atmosphere, and spring means acting on said arm intermediate the pivot for the arm and the counterweight and being effective to urge said arm against the normal flow of fluid and with said magnet in position to exert a magnetic bias on the blades of said reed switch.

3. Switch apparatus responsive to the velocity of a stream of fluid and comprising a housing adapted to be secured to the wall of a duct in which such a stream moves, and arm pivoted within said housing and having an end projected beyond said housing so as to be disposable in the duct, vane means on the projected end of said arm in position to be interposed in the stream of fluid, a counterweight adjustably mounted on said arm intermediate the ends thereof, a magnet on the end of said arm opposite said vane means, a switch having contacts adjacent said magnet and subject to the influence of said magnet whereby the proximate location of said magnet determines the condition of the switch contacts relative to the opening and closing thereof, and spring means within said housing acting on said arm and effective in cooperation with the velocity of the maving stream of fluid to control movement of said arm and the proximate location of said magnet.

4. Switch apparatus responsive to the velocity of a stream of fluid and comprising a housing adapted to be positioned adjacent the wall of a duct in which such a stream moves, an arm pivoted within said housing and having an end projected beyond said housing so as to be disposable in the duct, vane means on the projected end of said arm in position to be interposed in the stream of fluid to sense the velocity thereof, a magnet on the end of said arm opposite said vane means, said arm being provided with a counterweight movable to selected adjusted positions along the length thereof, a switch adjacent said magnet and having switch contacts movable to open and closed positions in response to the proximate location of the field of said magnet, and adjustable spring means within said housing acting on said arm and effective to resist pivotal movement of said arm under the velocity influence of the moving stream of fluid.

5. Switch apparatus responsive to the velocity of a stream of fluid and comprising a supporting means adapted to be positioned adjacent the wall of a duct in which such a stream moves, an arm mounted on a pivot supported by said means, vane means carried by said arm on one side of the pivot and in position to be interposed in the stream of fluid, a magnet carried by said arm on the other side of said pivot and movable therewith to vary the effective proximate location of the field of the magnet, said arm being provided with a counterweight movable to selected adjusted positions along the length thereof, a switch having contacts adjacent said magnet and said contacts being movable between open and closed positions in response to the proximate location of the effective field of the magnet, and adjustable spring means acting on said arm and effective to maintain the arm in a predetermined position against the velocity of the moving stream of fluid whereby the magnet in such predetermined position of the arm biases the switch contacts in one of the positions thereof and whereby the magnet in another position of the arm permits the switch contacts to assume the other position thereof.

References Cited in the file of this patent

UNITED STATES PATENTS

| | | |
|---|---|---|
| 725,259 | Kitsee | Apr. 14, 1903 |
| 1,776,297 | Sanderson | Sept. 23, 1930 |
| 2,600,309 | MacDonald et al. | June 10, 1952 |
| 2,842,150 | Olson | July 8, 1958 |
| 2,952,753 | Kmiecik et al. | Sept. 13, 1960 |

FOREIGN PATENTS

| | | |
|---|---|---|
| 741,484 | Great Britain | Dec. 7, 1955 |